(12) United States Patent  
Kierath et al.

(10) Patent No.: US 10,258,858 B2
(45) Date of Patent: Apr. 16, 2019

(54) GOLF SWING TRAINING DEVICE

(71) Applicant: Bellasilky Investments Pty Ltd, Brookvale NSW (AU)

(72) Inventors: Timothy Kierath, Brookvale (AU); Gary Bortz, Brookvale (AU)

(73) Assignee: Bellasilky Investments Pty Ltd, Brookvale NSW (AU)

( * ) Notice: Subject to any disclaimer, the term of this patent is extended or adjusted under 35 U.S.C. 154(b) by 0 days.

(21) Appl. No.: 15/531,928

(22) PCT Filed: Dec. 4, 2015

(86) PCT No.: PCT/AU2015/050770
§ 371 (c)(1),
(2) Date: May 31, 2017

(87) PCT Pub. No.: WO2016/086277
PCT Pub. Date: Jun. 9, 2016

(65) Prior Publication Data
US 2017/0259151 A1  Sep. 14, 2017

(30) Foreign Application Priority Data
Dec. 5, 2014 (AU) ................ 2014904922
Sep. 8, 2015 (AU) ................ 2015903664

(51) Int. Cl.
*A63B 69/36* (2006.01)
*G09B 19/00* (2006.01)
(52) U.S. Cl.
CPC ...... *A63B 69/3644* (2013.01); *A63B 69/3676* (2013.01); *G09B 19/0038* (2013.01); *A63B 2210/50* (2013.01); *A63B 2225/09* (2013.01)

(58) Field of Classification Search
CPC ........... A63B 69/3644; A63B 69/3676; A63B 2225/09; A63B 2210/50; G09B 19/0038
See application file for complete search history.

(56) References Cited

U.S. PATENT DOCUMENTS 1,567,530 A   12/1925  MacNaughton
4,034,991 A * 7/1977  Oppenheimer ...... A63B 21/154
                                                     434/252

(Continued)

FOREIGN PATENT DOCUMENTS

| CN | 104127997 A | 11/2014 |
| GB | 2210798 A | 6/1989 |
| WO | 2009007903 A2 | 1/2009 |

OTHER PUBLICATIONS

International Search Report for International Application No. PCT/AU2015/050770 dated Feb. 9, 2016.

(Continued)

*Primary Examiner* — Michael Dennis
(74) *Attorney, Agent, or Firm* — Carter, DeLuca & Farrell LLP

(57) ABSTRACT

A golf swing training device is provided with a hoop positioned above and inclined relative to an operating surface; a support frame connected to and adapted to support the hoop; and a carriage. The carriage has a body portion, a club holder being pivotally connected to the body portion, and a roller dolly being connected to the body portion, the roller dolly being secured to the hoop and adapted to rotate around a circumference of the hoop, wherein a longitudinal club shaft axis of the club holder is angularly offset relative to a plane which is perpendicular to an axis of symmetry of the hoop.

23 Claims, 14 Drawing Sheets

(56) References Cited

U.S. PATENT DOCUMENTS

| | | | | |
|---|---|---|---|---|
| 4,261,573 A | * | 4/1981 | Richards | A63B 69/365 |
| | | | | 473/229 |
| 5,072,942 A | | 12/1991 | Hurley | |
| 5,467,993 A | * | 11/1995 | Higginson | A63B 69/3644 |
| | | | | 473/229 |
| 5,595,545 A | | 1/1997 | O'Brien | |
| 8,591,349 B1 | | 11/2013 | Jones | |
| 2008/0153618 A1 | * | 6/2008 | Arther | A63B 69/3641 |
| | | | | 473/259 |
| 2013/0065704 A1 | * | 3/2013 | Napolitano | A63B 69/3644 |
| | | | | 473/259 |
| 2013/0331195 A1 | * | 12/2013 | Sery | A63B 69/365 |
| | | | | 473/223 |

OTHER PUBLICATIONS

Supplementary European Search Report completed Jul. 5, 2018 and issued in corresponding European Patent Application No. 15864652.

* cited by examiner

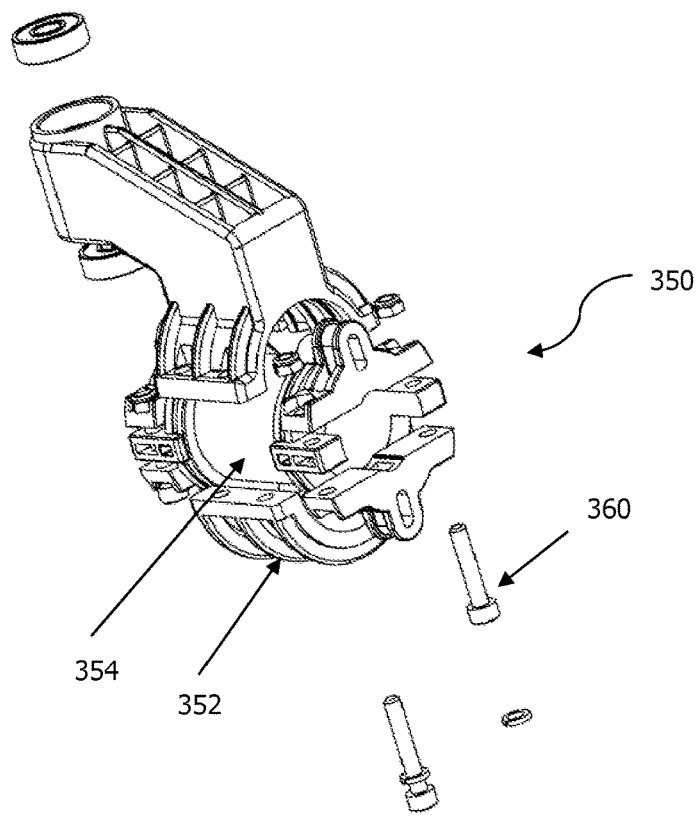
Fig. 9
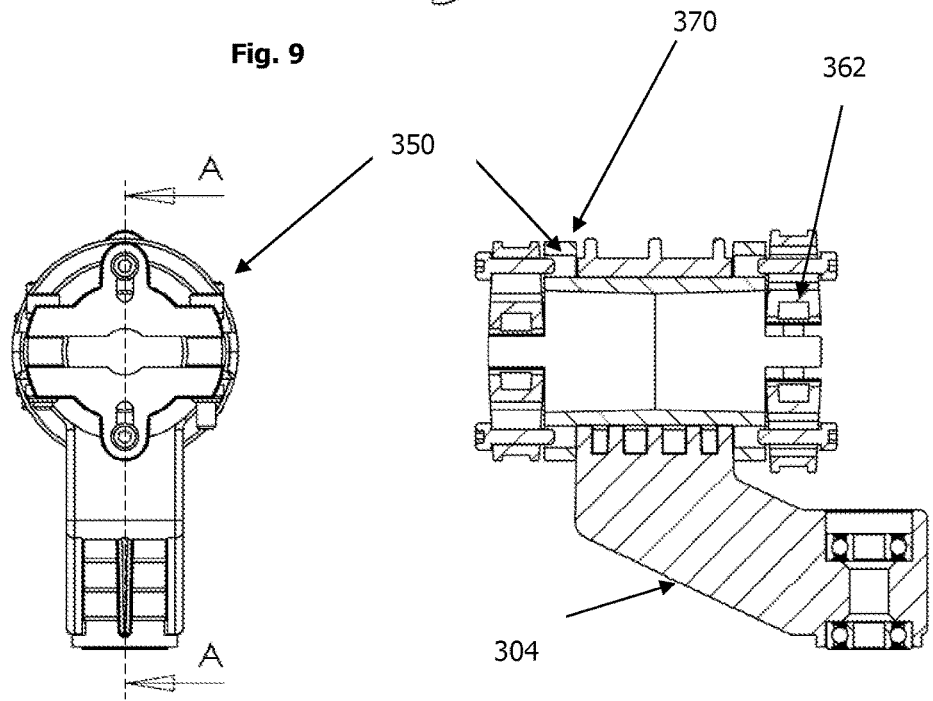
Fig. 10a  Fig. 10b

GOLF SWING TRAINING DEVICE

CROSS REFERENCE TO RELATED APPLICATIONS

This application is a national stage application of International Application No. PCT/AU2015/050770, filed Dec. 4, 2015, which claims the benefit of and priority to Australian Patent Application No. 2014904922 filed Dec. 5, 2014 and Australian Patent Application No. 2015903664 filed Sep. 8, 2015, the entire contents of each of which are hereby incorporated by reference.

FIELD OF THE INVENTION

The present invention relates to a golf swing training device. In particular, the present invention relates to a device for assisting a user to correct and/or improve their golf swing.

BACKGROUND OF THE INVENTION

The sport of golf is popular worldwide, and has seen increasing popularity in recent years. It is estimated that there are approximately 60 million club and recreational golfers worldwide. What most golfers strive to achieve is to hit the ball straight, and with a ball flight and length that is consistent with the intended design of the club being used. There are various elements that influence a player's ability to achieve this aim. The elements that are quite easily learnt by any golfer include stance, club grip, posture, and alignment. A much more difficult element to learn and master, and arguably the most important, is the swing.

A desirable golf swing is one that is repeatable, such that the golfer is able to consistently deliver the club head of a golf club at an angle square to the golf ball at impact. Successful professional golfers are those who are best able to achieve a repeatable golf swing and then apply that golf swing with good course management to navigate a golf course in the fewest shots. With a few notable exceptions, such professional golfers generally have swings with similar mechanics, whereby the golf club is taken back and then returned to the ball substantially along a single plane.

Approximately 95% of golfers worldwide have a handicap of more than 11, indicating that most golfers have one or more swing flaws that prevent them from consistently scoring in accordance with the stipulated number of strokes allocated for completion of a golf hole, commonly referred to as "par". When a golfer takes the golf club back on an incorrect swing plane, then the golfer typically employs a series of compensatory actions in an effort to enable the club head to contact the ball. However, the compensatory actions generally deliver inconsistent results, such as reduced or inconsistent distance, pushing or pulling the ball, hooking or slicing the ball, poor ball flight, topping the ball, a combination of these problems, or even missing the ball entirely.

Professional golfers generally utilise a swing that is mechanically more refined when compared to the types of swings practised by most club and recreational golfers. Many non-professional golfers may think they understand the basics of a good swing, however, in reality they are often unaware that there is a large difference in the mechanics of a typical professional's swing when compared to the swing of a club golfer. This typically relates to those with a handicap of 8 or more. As a player's ability increases and he/she obtains a handicap below 8, it is likely that the player will achieve a swing which is based on solid mechanics and more closely resembles the swing of a typical professional golfer.

Existing golf training devices are known which attempt to guide a user through a golf swing. Such devices typically guide just the shaft of the club by using a guiding rail which is located beneath the shaft. However, in practice this does not provide an accurate or realistic simulation of a well-executed golf swing because it is the hands that dictate the swing plane, not that shaft, so supporting only the shaft renders the hands left free to do whatever they like.

When considering existing golf swing training devices, for the hoop based versions, regardless of hoop diameter, they typically only permit the shaft to travel on the same plane (or a parallel plane) as the hoop, namely the same plane (or a parallel plane) as the hands. From a technique point of view, this does not reflect a desirable swing path because with the guiding rail located beneath the shaft, the shaft is not permitted to be laid back. If this action is attempted, the hoop or guiding rail immediately interferes with the shaft, preventing it from creating the desired angle on both the backswing and follow through.

In such hoop based existing golf swing training devices, it is generally not possible to locate the hands close enough to the body at address, because the hoop and any attached carriage get in the way (i.e., the correct ball address position cannot be achieved).

Golf coaches and teaching professionals are able to correct static alignment and postural issues of a golf student at address, as the golf coach is able to interact directly with the student while the club is not being moved. Golf coaches and teaching professionals are also able to instruct students in relation to the position of the club and hands at the top of the backswing, as a static position. However, once the student seeks to practise a full swing, with the clubhead reaching speeds of up to 120 miles/hour, it is not possible for the golf coach to be able to interact directly with the student to guide the correct club and hand position.

OBJECT OF THE INVENTION

It is an object of the present invention to substantially overcome or at least ameliorate one or more of the above disadvantages, or at least to provide a useful alternative.

SUMMARY OF THE INVENTION

The present invention provides a golf swing training device comprising:
  a hoop positioned above and inclined relative to an operating surface;
  a support frame connected to and adapted to support the hoop; and
  a carriage having a body portion, a club holder being pivotally connected to the body portion, and a roller dolly being connected to the body portion, the roller dolly being secured to the hoop and adapted to rotate around a circumference of the hoop;
  wherein a longitudinal club shaft axis of the club holder is angularly offset relative to a hoop plane which is perpendicular to an axis of symmetry of the hoop.

The golf swing training device further preferably comprises a wedge bracket located between the body portion and the club holder, the wedge bracket being selectively interchangeable or adjustable to alter the angular offset of the longitudinal club shaft axis of the club holder relative to the hoop plane.

The longitudinal club shaft axis is generally preferably perpendicular to a pivot axis about which the club holder is pivotally connected to the wedge bracket. In one arrangement the device further comprises a club holder arm having a proximal end pivotally connected to an inclined surface of the wedge bracket and a distal end connected to the club holder.

The hoop preferably includes a first ring and a second ring having a larger diameter, the first ring being located concentrically within the second ring.

The first and second rings are each preferably toroidal in cross-section and coplanar.

An annular clearance is preferably located between the first and second rings.

The roller dolly preferably includes a plurality of rollers, adapted to engage with the first and second rings.

The golf swing training device preferably includes a first set of rollers in engagement with the first ring and a second set of rollers in engagement with the second ring.

The first and second sets of rollers and the first and second rings preferably restrict movement of the roller dolly to arcuate movement around a circumference of the hoop in a single plane.

The roller dolly is preferably adapted to pivot relative to the body portion of the carriage.

The roller dolly is preferably coupled to the body portion of the carriage with a shaft.

The club holder is preferably adapted to pivotally support a golf club, such that the golf club is permitted to pivot about a longitudinal axis of a shaft of the club.

The club holder preferably includes an external sleeve and an internal sleeve adapted to receive and abut against a portion of the shaft of the golf club, wherein the internal sleeve is adapted to rotate relative to the external sleeve.

A hand engagement portion of a grip of the golf club is preferably located adjacent to the roller dolly, such that in use, a user's hands are directed to follow an arc corresponding generally to an arc followed by the roller.

The roller dolly and/or carriage body portion are preferably adjustable to selectively alter a radius of an arc followed by a user's hands.

The golf swing training device preferably includes a media support unit secured to the support frame.

The wedge bracket is preferably secured to a mounting plate, wherein the wedge bracket is selectively moveable relative to a longitudinal axis of the mounting plate to adjust a radius of an arc of rotation of the club holder.

The mounting plate is preferably secured to the carriage body portion and the mounting plate is selectively moveable relative to the carriage body portion to adjust the radius of the arc of rotation of the club holder.

Preferably the golf swing training device further includes an extension arm located between the club holder and the roller dolly, such that the club holder is located below a lowermost portion of the hoop when the club holder is in an address position.

The extension arm is preferably pivotally secured to the wedge bracket.

The golf swing training device preferably includes a wall mounting assembly adapted to secure the hoop to a wall or other surface.

The wall mounting assembly preferably includes:
  at least one wall securement member adapted to be secured to a wall or other surface;
  a pivot arm having a proximal end pivotally secured to the wall securement member and a distal end; and
  a hoop mounting arm having a proximal end pivotally secured to the wall securement member and a distal end pivotally secure to the hoop;
  wherein a distal end of the pivot arm includes a projection which engages with a corresponding longitudinally extending slot formed on the hoop mounting arm.

The hoop mounting arm proximal end is preferably located vertically beneath the pivot arm proximal end when installed on a wall or other generally vertical surface.

The golf swing training device further preferably comprises a putter bracket located between the body portion and the club holder, the putter bracket being adjustably connected to the club holder to selectively alter the angular offset of the longitudinal club shaft axis of the club holder relative to the hoop plane.

BRIEF DESCRIPTION OF THE DRAWINGS

A preferred embodiment of the invention will now be described by way of specific example with reference to the accompanying drawings, in which:

FIG. 9 is a partially exploded view showing a club holder of the golf swing training device;

FIG. 10a is an end view of the club holder of FIG. 9;

FIG. 10b is a cross-sectional side view of the club holder of FIG. 9;

DETAILED DESCRIPTION OF THE PREFERRED EMBODIMENTS

Figure 1:
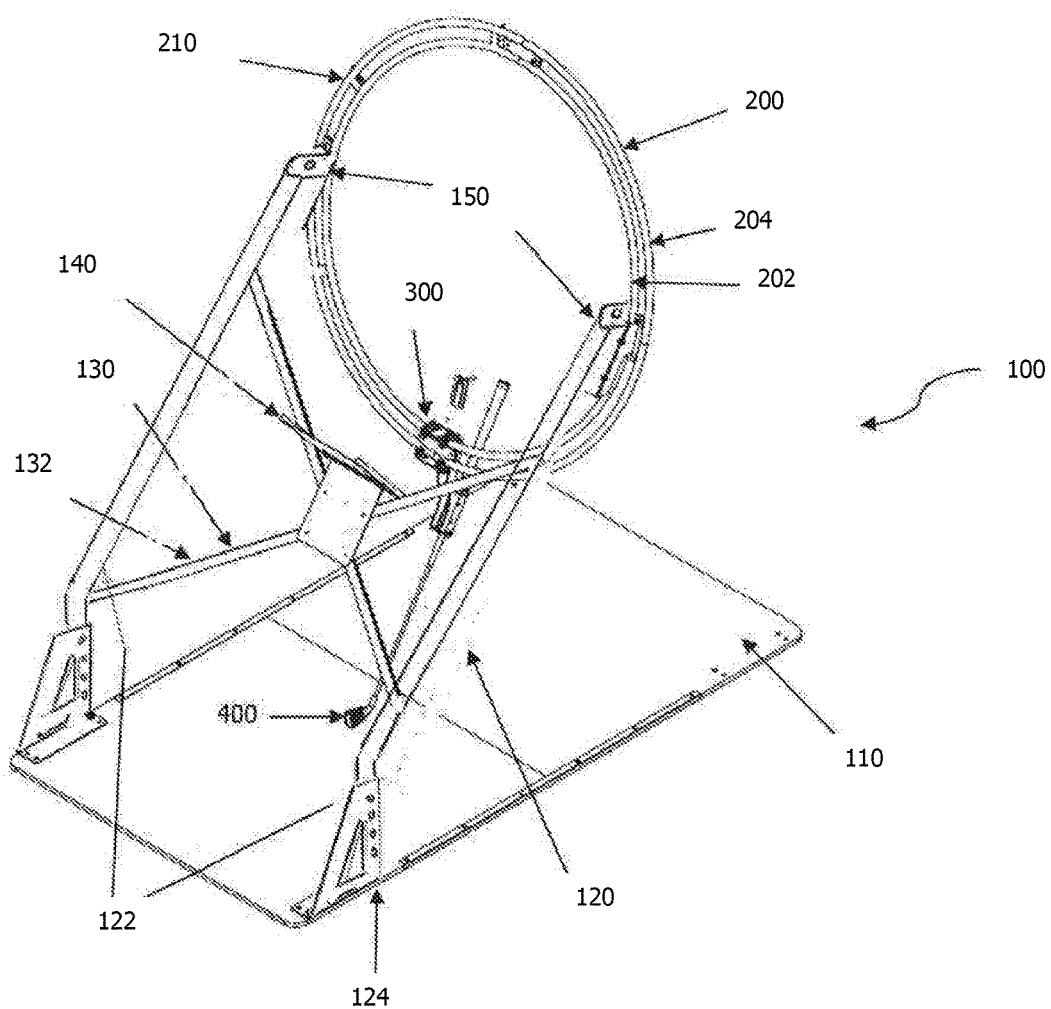
FIG. 1 is a rear perspective view of a golf swing training device with the club depicted in the strike (or impact) position (at address)
Figure 2:
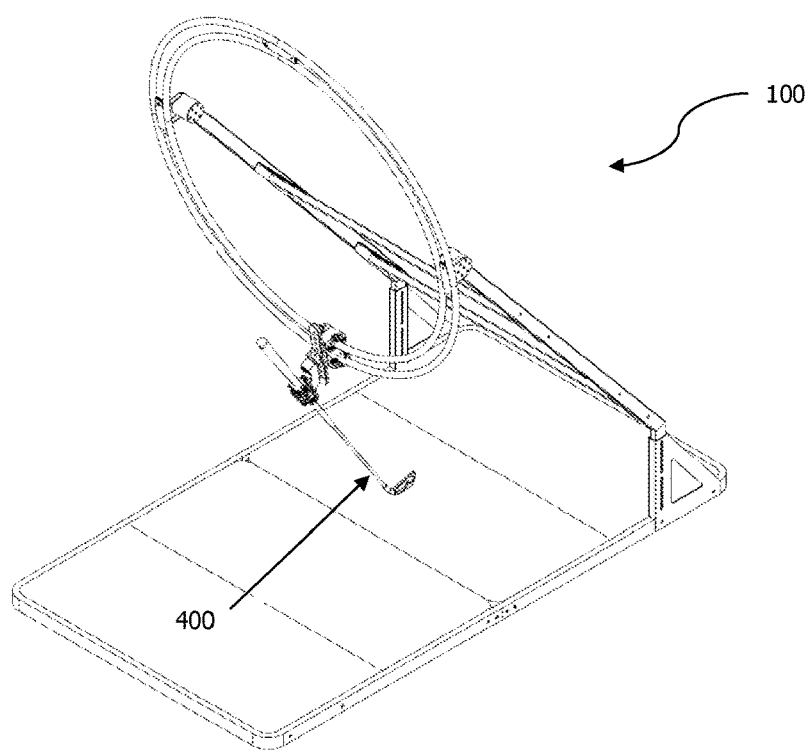
FIG. 2 is a front perspective view of a golf swing training device.
Figure 3:
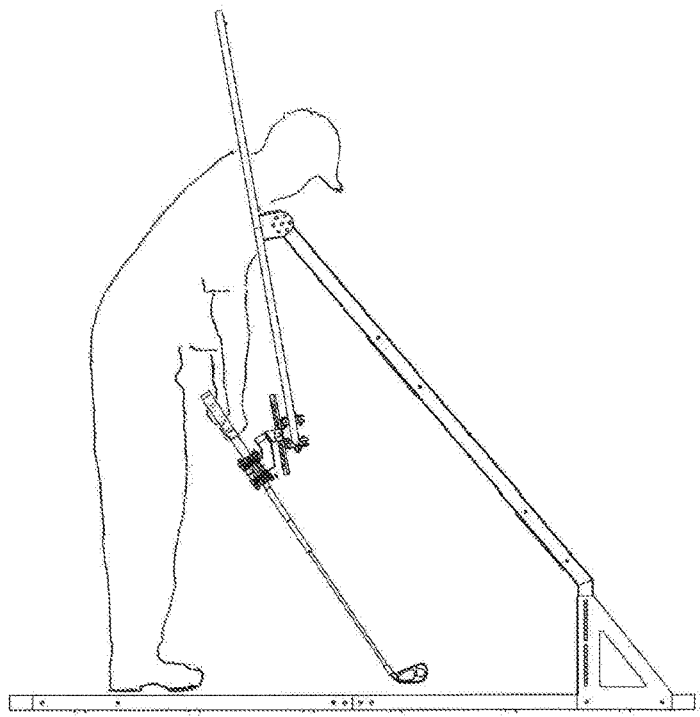
FIG. 3 is a side schematic view depicting a user operating the golf swing training device of FIG. 1.

A study of the swings of professional golfers going back to Ben Hogan has identified a number of common characteristics. For example, on the takeaway portion of the backswing when the shaft is parallel to the ground, almost all professional golfers have the club head in front of the hands. That is, if one drew a line along the length of the shaft, the line would point to the front left of a right handed player; not straight ahead and certainly not to the front right, as it does with most club golfers. Most notably, the swings of the best golfers through that time generally have similar characteristics. Their hands follow a substantially single plane in the backswing and downswing while the shaft angle of the club follows a different path as described herein, so that the golfer is able to consistently and repeatedly deliver the club head to the ball. By following a single plane, the hands of the golfer are at substantially the same position at the point of impact as at address.

The present disclosure provides a golf swing training device 100 that is adapted to attach to an upper portion of the shaft of a golf club 400, close to or on the grip, so as to guide the hands of a golfer throughout the swing. This enables the golfer to feel the correct position for the hands throughout the swing, irrespective of the speed at which the swing is executed. The golf swing training device 100 includes a hoop 200 positioned above and inclined relative to an operating surface 112 and a carriage 300 coupled to the hoop 200, wherein the carriage 300 includes a club holder 350. The golf swing training device 100 delivers the club head square to the ball.

Existing golf training devices typically incorporate a guide rail or board positioned underneath the shaft of the golf club 400 and do not control movement of the hands of the golfer. In contrast, the club holder 350 of the present disclosure positions the club 400, and thus the hands of the golfer, beneath the plane defined by the circumference of the hoop 200, such that the golfer can obtain the preferred hands position at address with arms dropping vertically from the shoulders, have his/her hands guided on the preferred plane and importantly permit the current invention to guide the shaft into the "laid off" position both on the backswing and follow through.

The golf swing training device 100 enables a golf player to repeatedly practise and improve his/her golf swing. The golf swing training device 100 guides the hands of a user along an intended swing path, from the backswing, through the point of impact, and to the follow through. This results in the user experiencing having his/her hands and a club 400 guided through a well executed golf swing substantially along a single plane. Through repeated practice with the golf swing training device 100, the user can improve the accuracy and consistency of his/her own swing. In addition, the golf swing training device 100 guides the golf club shaft angle from address, through the backswing, into the downswing and then all the way to the top of the follow through, so that the user is in no doubt as to any part of the swing.

In the embodiment depicted in FIG. 1, the golf swing training device 100 includes a base 110. The base 110 provides an operating surface 112 for the user to stand on. In one embodiment, the operating surface 112 may include an aperture or other formation for receiving a golf tee (not shown). The operating surface 112 may include one or more portions of artificial grass, matting, pad, or other suitable covering from which a golf ball may be struck. The operating surface 112 may also include visual markings, such as a centreline marking, or suggested foot position markers, and other alignment markers. Such visual markings may be used to align a user correctly relative to the device 100 and an intended target line. The visual markings can be used as reference points by the user, alone or in combination with a golf coach or teaching professional. Such reference points may be particularly useful when used in conjunction with a video recording device for recording instances of the user's swing.

The golf swing training device 100 of a first embodiment includes a support frame 120, which is secured to and extends upwardly away from the base 110, at an angle of approximately 55 degrees relative to the generally horizontal operating surface 112. The support frame 120 includes two generally parallel legs 122, which are each connected to a mounting bracket 124, which is secured to the base 110.

At least one diagonal or horizontal brace 130 connects the two generally parallel legs 122. The diagonal or horizontal brace 130 provides additional stiffness and rigidity. In the embodiment depicted in the drawings, there are two diagonal braces 130, defining an X-shaped formation 132. A media support unit 140 is mounted to the central portion of the X-shaped formation 132. The media support unit 140 enables an electronic media device (not shown) such as a tablet, monitor or laptop to be supported with the screen facing the user. This enables instructional material to be shown to the user before, during, or after practice of the golf swing.

The electronic media device may be coupled to a video recording device, such as a video camera, to allow a user to record and view swings during a practice session. In one arrangement, the electronic media device includes a video or still camera. For example, the electronic media device may be a tablet computing device that includes a video camera. The electronic media device may also be coupled to a launch monitor or other tracking system, such as launch monitors made by Trackman A/S, Flightscope, Accusport, and the like, so that the user can view launch information relating to each swing. Such launch information can include, for example, angle of attack, swing path, spin rate, clubhead speed, ball speed, launch angle, apex, angle of descent, carry, roll, and total distance. Coupling of the electronic media device to a video camera or launch monitor may be effected using wired or wireless technologies, including Ethernet, Bluetooth, Wi-Fi, ANT+, and the like.

An upper, distal end 150 of each leg 122 is connected to a double ring or hoop 200. The hoop 200 includes a first ring 202 and a second ring 204 having a larger diameter, such that the first ring 202 is located concentrically within the second ring 204, and an annular clearance is located between the first and second rings 202, 204. A plurality of radially extending spokes 210 extend between and connect the first and second rings 202, 204. Each of the first and second rings 202, 204 is generally toroidal, and located in the same plane. However, it will be appreciated that the first and second rings 202, 204 may be manufactured with other cross-sectional profiles. It will be further appreciated that the spokes 210 may be replaced by other coupling devices that maintain the position of the first and second rings 202, 204 relative to one another.

Figure 4:
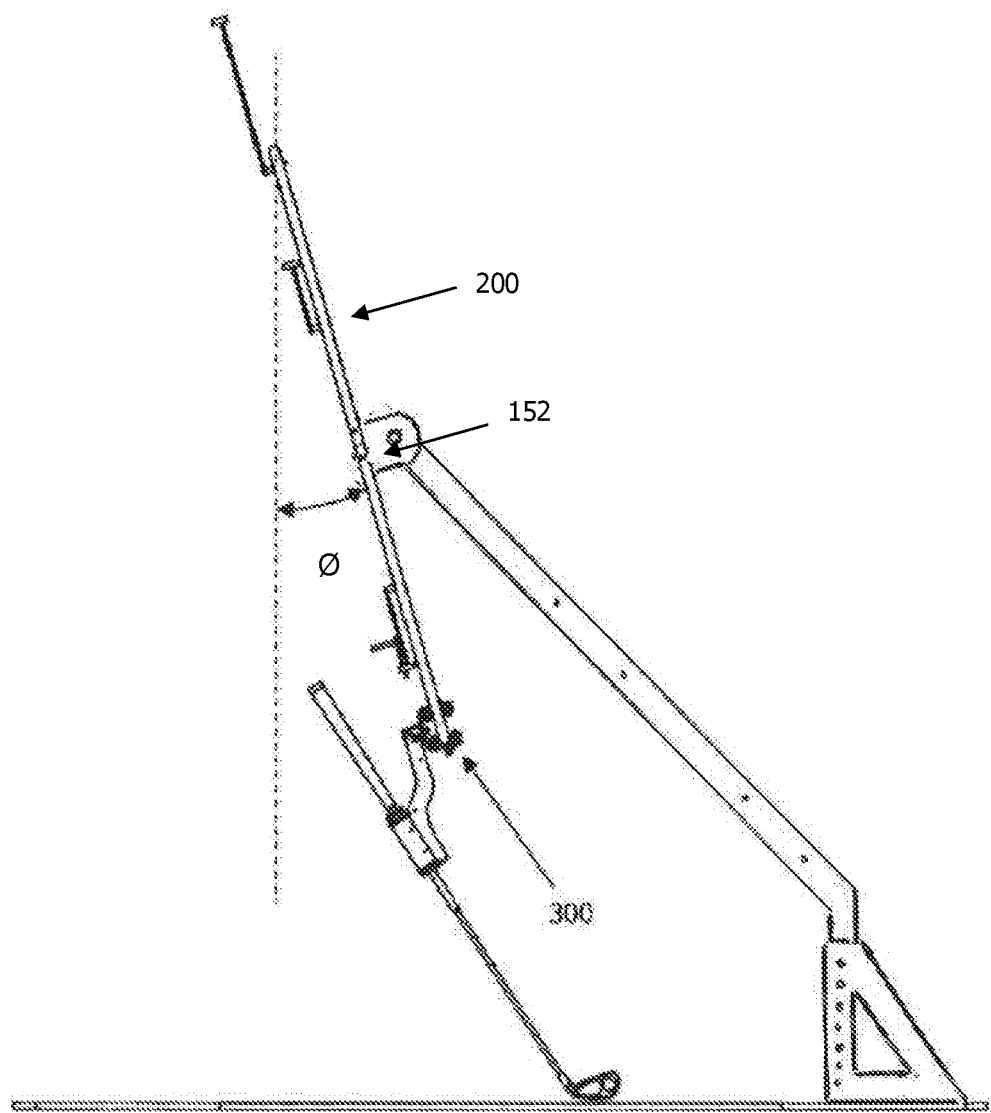
FIG. 4 is a side view of the golf swing training device of FIG. 1.
Figure 5:
FIG. 5 is a side view of the golf swing training device depicted in the backswing position.

The hoop 200 may be inclined at an angle relative to a vertical axis by an angle ∅, as best seen in FIG. 4. The angle ∅ is preferably in the range of between about 0 to 20 degrees. The hoop 200 has an axis of symmetry, being an axis passing through a central point of the hoop 200, similar to an axle of a wheel.

Figure 6:
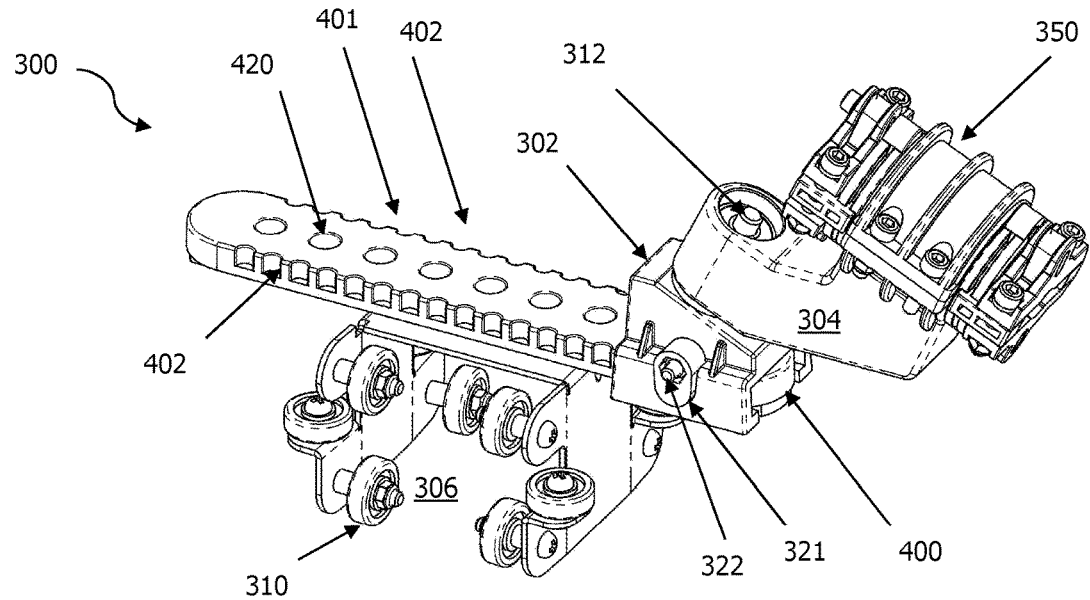
FIG. 6 is a perspective view depicting a roller dolly and club holder assembly according to a first embodiment.
Figure 7:
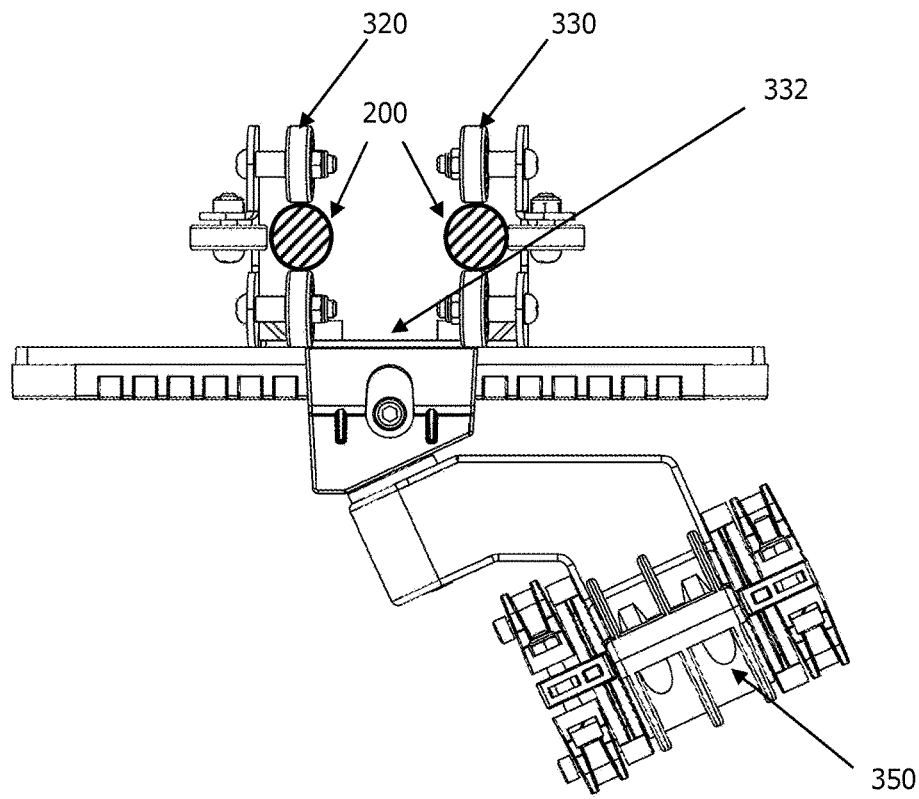
FIG. 7 is a side view of the roller dolly and club holder assembly of FIG. 6.
Figure 8:
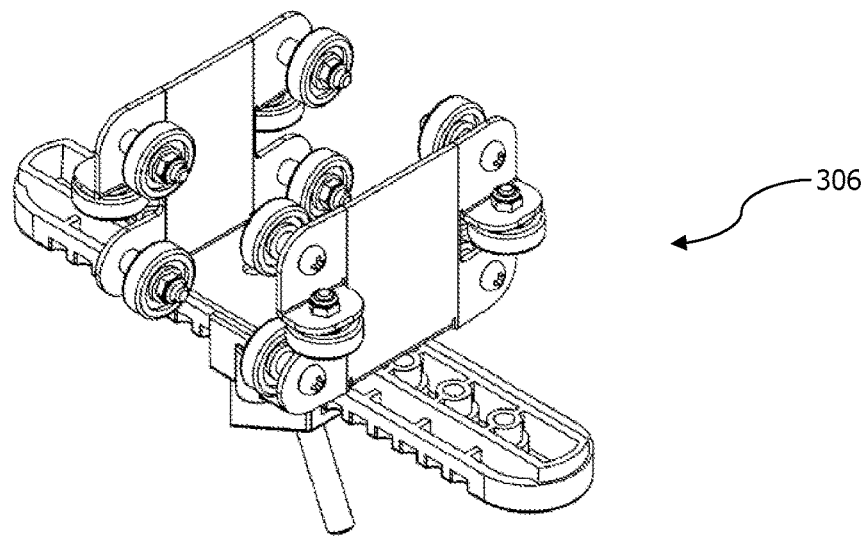
FIG. 8 is a bottom perspective view of the roller dolly according to FIGS. 6 and 7.

A first embodiment of a carriage 300 of the golf swing training device 100 is depicted in FIGS. 6 to 8. The carriage 300 is operatively associated with the hoop 200, as shown in FIGS. 1 to 5. The carriage 300 includes a carriage wedge bracket 302 connected to an arm 304. A club holder 350 is located at one end of the arm 304, and a roller dolly 306 is located at a generally opposing end of the carriage 300.

A plurality of rollers 310 are mounted to the roller dolly 306. As shown in FIGS. 7 and 8, the rollers 310 include a first set of rollers 320 and a second set of rollers 330. The first set of rollers 320 engages with the first, inner ring 202 and the second set of rollers 330 engages with the second, outer ring 204 of the hoop 200. This is schematically depicted in FIG. 7. The rollers 310 are nylon wheeled bearings.

The interaction between the first and second rings 202, 204 and the first and second sets of rollers 320, 330 results in movement of the roller dolly 306 being restricted to arcuate movement around a circumference of the hoop 200, in a single plane. Accordingly, the roller dolly 306 is prevented from pivoting about an axis defined by a local tangent line intersecting a portion of the hoop 200.

Each set of rollers 320, 330 preferably has six rollers. However, it will be appreciated that greater than or fewer than six rollers 310 may be utilised in each set of rollers 320, 330. The combination of the two sets of rollers 320, 330 prevents the carriage 300 from being unintentionally removed from the hoop 200.

The carriage 300 includes a club holder 350 for engaging a shaft of a golf club 400. In one arrangement, the club holder 350 is adapted to engage an upper portion of the shaft adjacent to a grip portion of the golf club 400. As shown in FIG. 9, the club holder 350 includes an external sleeve 352 and an internal, removable sleeve 354, which is preferably manufactured from an elastically deformable polymer. In one arrangement, the internal sleeve 354 is a rubber sleeve with a slit along a longitudinal axis, such that the internal sleeve 354 may be slipped onto the shaft of a golf club 400. In one mode of operation, the golf shaft is passed through the external sleeve 352 and the internal sleeve 354 is then fitted to the golf shaft, such that the internal sleeve 354 is located between the shaft of the golf club 400 and the external sleeve 352. A plurality of fasteners 360 pass through holes formed in the external sleeve 352, and can be adjusted to apply a force against the external wall of the internal sleeve 354. This permits the golf club 400 to be held in the desired location without damaging the golf club shaft or grip. In one embodiment, the external sleeve 352 may be rotatable relative to the internal sleeve 354.

The support frame 120 supports the hoop 200 in such a way that permits the golf club 400 when mounted to the carriage 300 to swing in an unimpeded manner along a controlled path, as directed by the user's hands. During the path of the golf swing, the roller holding dolly 306 remains generally in a single plane. It will be appreciated by a person skilled in the relevant art that other embodiments of the support frame 120 may be envisaged, such as the wall mounted support frame of FIGS. 14 to 17.

Given that players vary in their physical dimensions, such as height, shape and arm length, the golf swing training device 100 optionally includes one or more means of adjustment that enable the golf swing training device 100 to be customised for a large percentage of potential users.

Embodiments of the golf swing training device 100 optionally include an adjustment means 401 for varying the radius of the swing arc. The adjustment means 401 includes an adjustment plate 402 shown in FIG. 6. The adjustment plate 402 permits the location of the rollers 310 to be adjusted relative to the carriage wedge bracket 302 of the carriage 300, thereby changing the radius of the swing arc. Alternatively, in another embodiment not shown in the drawings, the arm 304 of the carriage 300 may be telescopically or otherwise adjustable in length.

Embodiments of the golf swing training device 100 optionally enable the height of the hoop 200 to be adjustable via the vertical part of the arm 120 sliding up or down in a sleeved base mount.

Embodiments of the golf swing training device 100 optionally enable the angle of the hoop 200 relative to the generally horizontal operating surface 112 to be variable, such that the angle of the hoop 200 can be set to suit an individual user at an optimised ideal angle to guide the user's hands along the intended swing path, in the backswing, through the point of impact, and the follow through. In one implementation, the angle of the hoop 200 is adjusted via spaced holes in bracket 152.

In an alternative arrangement, the golf swing training device 100 does not include a base 100. In such an arrangement, the support frame 120 is adapted to be secured to the ground via mounting brackets, plates, pegs, guy ropes, or other suitable securing devices. In a further arrangement, the support frame is self-supporting, such that the support frame 120 is able to stand upright without a securing device. For example, horizontal support members extending back underneath the hoop 200 may be attached to the mounting bracket 124.

Figure 11:
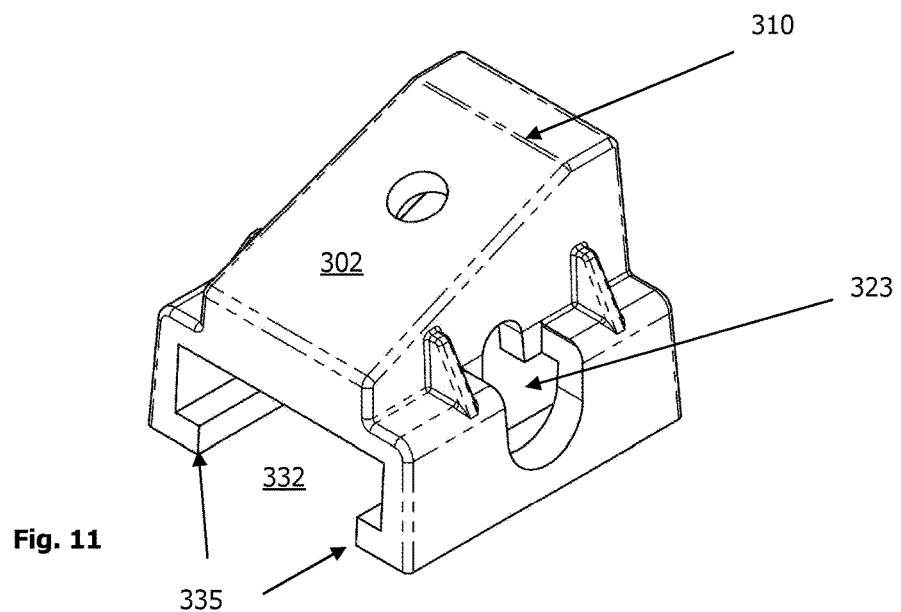
FIG. 11 is a perspective view depicting a wedge bracket of the roller dolly.
Figures 12, 13:
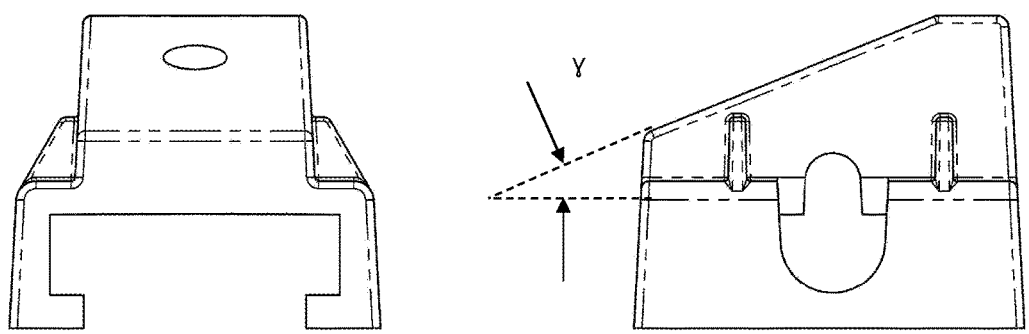
FIG. 12 is a front view of the wedge bracket of FIG. 11.
FIG. 13 is a side view of the wedge bracket of FIG. 11.

The wedge bracket 302 is depicted in isolation in FIGS. 11 to 13 in perspective, front and side plan views. The wedge bracket 302 effectively provides an angular offset of the club holder 350 relative to the roller dolly 306. The wedge bracket 302 is pivotally secured to the arm 304, as depicted in FIG. 6 with a pivot pin or bearing 312. The wedge bracket 302 is interchangeable, and can readily be replaced with a different wedge bracket 302 having a different angle of inclination γ.

Again referring to FIG. 6, the wedge bracket 302 is mounted on the adjustment plate 402. The adjustment plate 402 has a plurality of recesses or notches 403 which are located on two generally parallel, longitudinally extending sides of the adjustment plate 402.

The wedge bracket 302 includes a pair of clamp jaws 321, seated in openings 323 formed on opposing sides of the wedge bracket 302. The clamp jaws 321 are located on opposing sides of the wedge bracket 302, and a screw 322 or other suitable fastener extends between them. By tightening the screw 322, the two clamp jaws 321 are pulled toward each other. Each clamp jaw 321 includes a partially cylindrical projection which corresponds in shape with the notches 403. The screw 322 may be provided with a knob or handle to obviate the need for tools when making an adjustment.

The wedge bracket 302 may be provided in different angles γ (See the side view of FIG. 13). As such, the user or trainer can readily interchange the wedge bracket 302 to increase or decrease the angle γ to suit different clubs. In one version, not depicted in the drawings, the wedge bracket 302 may be selectively adjustable between different angles γ.

An underside of the wedge bracket 302 includes two arms or projections 335 which are directed toward each other. The arms 335 define a receptacle 332 for receiving the adjustment plate 402.

When the screw 322 is tightened, this causes the clamp jaw 321 to engage with the notches 403, which longitudinally isolates the wedge bracket 302 (and also the interconnected club holder 350) relative to the mounting plate 1400.

The location of the club holder 350 relative to the roller dolly 306 can be adjusted in one of two ways. A first adjustment means is provided on account of the adjustment plate 402 being longitudinally moved, by retracting the screw 322 and sliding the adjustment plate 402 longitudinally before re-engaging the screw 322, such that the clamp jaws 321 engage with a different recess 403.

A second adjustment means is provided on account of the central region of the adjustment plate 402 having a plurality of holes 420 arranged on a common axis, and a fastener extends through at least one of the holes 420 and engages with a body portion 332 of the roller dolly 306.

Accordingly, the golf swing training device 100 allows small or large adjustment of the club 400 position relative to the hoop 200, and therefore the effective diameter of the hoop 200 from a user point of view, by making an adjustment with respect to one or both of the first and second adjustment means.

In order to replicate the golf swing principles utilised by most touring golf professionals there are two core elements. The first is that the hands should follow a substantially single plane in the backswing and downswing, typically at an angle of 70 to 80 degrees from the ground, but dependent on the club being used, could be 5 degrees more or 5 degrees less. The roller dolly 306 performs this function.

The second core element is the path that the golf club 400 and, in particular, that the shaft prescribes and it is the wedge bracket 302, the arm 304 and the bolt with bearing 312 that perform this function as follows.

On account of the interaction between the wedge bracket 302, and the arm 304, a longitudinal portion of the arm 304 is generally parallel to a plane passing through both rings of the dual hoops 200 when the club 400 is located in an initial, address position. However, during the golf swing, as the club moves into the back swing, due to pivoting of the arm 304 relative to the wedge bracket 302, the longitudinal portion of the arm 304 becomes angularly inclined relative to the plane passing through both rings of the dual hoops 200.

When the club 400 is in the address position, the angle formed between the shaft of a six iron and the ground is approximately 60 degrees. If the club 400 is rotated about the wedge bracket 302, through an angle of 180 degrees, such that the club head becomes the highest portion of the club 400, the club 400 is subsequently oriented such that the angle between the shaft and the ground is again approximately 60 degrees. In so doing the club 400 and the club shaft angle is precisely guided along the prescribed ideal path throughout the total swing, while the roller dolly 306 keeps the hands tracking on the ideal swing plane of about 80 degrees.

The operation of the golf swing training device 100 will now be described. A desired golf club 400, such as a 5 or 6 iron, is fitted to the carriage 300, and secured in the manner described above. The vertical height of the grip portion of the golf club 400 may be adjusted within the carriage 300 to suit specific dimensions, such as height and arm length of the user. This may be done by making an adjustment of the golf club 400 relative to the internal sleeve 354. Alternatively, the two generally parallel legs 122 of the support frame 120 can be selectively telescopically adjustable vertically, or otherwise extensible or angularly adjustable to alter the vertical position of the hoop 200.

A player stands on the operating surface 112, and takes grip of the golf club. The head and shoulders of the player are inserted through the central opening formed in the hoop 200, as depicted schematically in FIG. 3. The player's hand grip is located adjacent to the roller dolly 306. This means that during rotation through the golf swing, the arc that the user's hands follow corresponds generally to the arc defined by the hoop 200.

The hoop 200 provides a track along which the roller dolly 306 of the carriage 300 is permitted to run freely, and smoothly. On account of the first, inner ring 202 and the second, outer ring 204, the roller dolly 306 is forced to maintain a consistent and predetermined angular orientation during rotation, relative to a plane passing through the first and second rings 202, 204.

The arm 304 is pivotally secured to the wedge bracket 302, with a pin or shaft 312 as depicted in FIG. 6. The shaft 312 enables the arm 304 to swing or pivot relative to the wedge portion 302 during rotation about the hoop 200, about an axis which is generally perpendicular to a plane passing through the first and second rings 202, 204.

In addition, the golf club 400 shaft is permitted to rotate relative to the interconnected club holder 350. In one arrangement, a mounting collar 370 is coupled to each end of the external sleeve 352 and is nylon lined and grooved to limit the rotation of the external sleeve. In one implementation, the mounting collar 370 is adapted to limit rotation of the external sleeve 352 to approximately 45 degrees clockwise and 22.5 degrees anticlockwise, by using a pin and groove design. Such rotation of the external sleeve 352 occurs about a longitudinal axis of the shaft of the golf club 400. As depicted in FIG. 10b, a pair of bearings 362 enable the inner sleeve 354 to pivot relative to the external sleeve 352.

Accordingly, the user is permitted to rotate the golf club 400 up to 45 degrees at the end of the downswing (follow through), and up to 45 degrees at the top of the backswing.

In use, the carriage 300 promotes the club head returning back to square at impact on a slightly in-to-out path. Such an in-to-out path is desirable as it promotes a golf shot with a slight draw, from right to left for a right-handed player, and from left to right for a left handed player.

The user may watch educational material, such as a video shown on a tablet or laptop computer or other electronic media device mounted on the media support unit 140. As described above, such an electronic media device may be coupled to a launch monitor, so that launch information is able to be displayed on a screen of the electronic media device. Further, a video of the player may be displayed adjacent to or overlaid by a video of a professional golfer.

One arrangement provides an analyser mount (not shown) on the carriage 300 for securing an analysis device. The analysis device may measure data relating to the club and/or the swing and may be implemented, for example, using a video camera, SkyPro by SkyGolf, MySwing by Noitom, SwingSmart, Zepp, SwingTip, 3Bays Golf Swing Analyzer, or any other golf swing analyser. The analysis device is optionally configurable to connect via a wired or wireless connection to an electronic media device located in the media support unit 140.

Advantageously, the carriage 300 holds the golf club 400 close to the user's grip, such that the user's hands are directly opposite the carriage 300 on the dual hoop 200. This results in the user's hands being closely guided along the path of the hoop 200. As such, the user is guided to achieve the desirable predetermined path and swing plane.

Advantageously, the hoop 200 is located above the user's hands and the shaft of the golf club 400, thereby permitting the golf club 400 to be laid off during the backswing, the downswing and the follow through and for the user's hands and club to be genuinely guided along the same or a similar path that would be taken by many professional golfers.

Advantageously, the golf swing training device 100 assists in building consistency and accuracy in a player's swing.

Advantageously, the golf swing training device 100 guides the golfer's hands and club 400 in a way that mimics the swing of typical professional tour golfers.

Advantageously, the golf swing training device 100 permits the user to groove in the correct swing by repetition, every day if desired. It is well known that even after a series of lessons, most golfers revert to their original bad habits after a month or two or, even worse, practise inaccurately and ingrain a poor swing path. Most professional golfers have a coach who is responsible for ensuring that bad habits do not creep in. This training device has the potential to fill the same role as the coach of a professional golfer.

Figure 23:
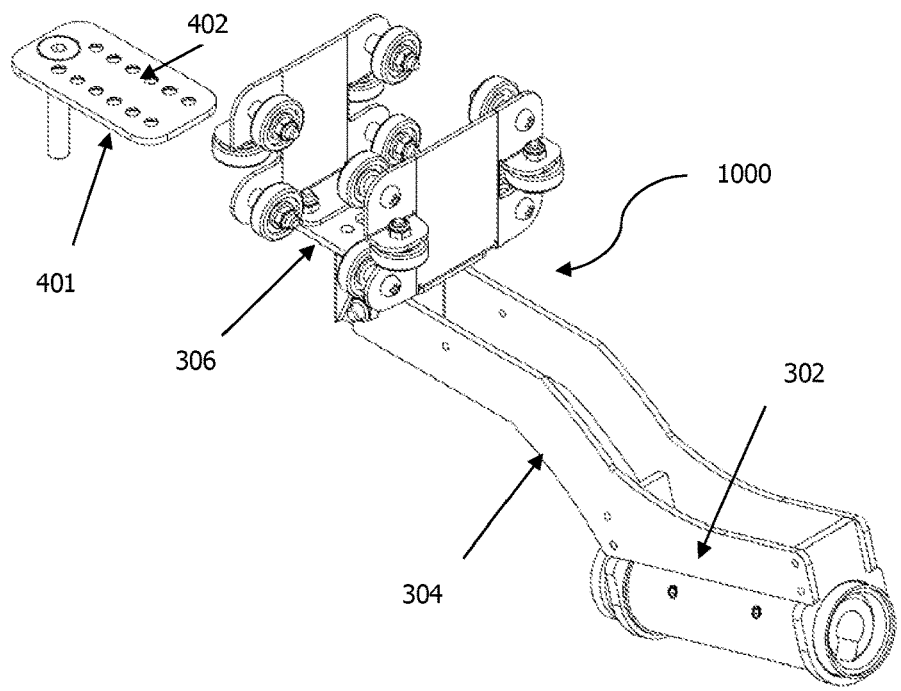
FIG. 23 is a perspective view of a carriage and arm assembly and roller dolly according to a second embodiment.
Figure 24:
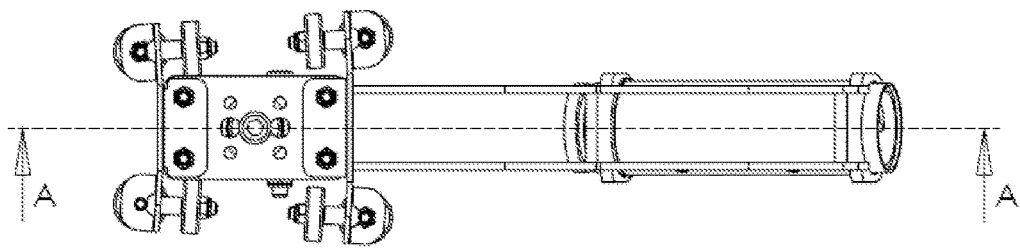
FIG. 24 is a top view of the carriage and arm assembly of FIG. 23.
Figure 25:
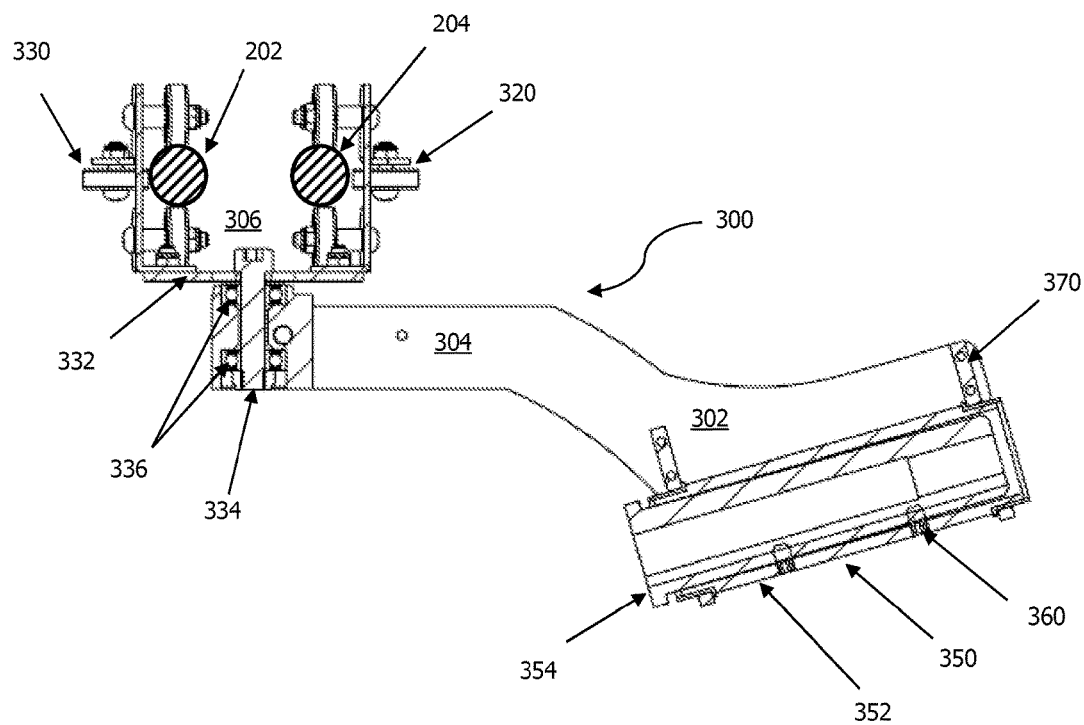
FIG. 25 is a cross-sectional side view of the carriage and arm assembly of FIG. 23.

A second embodiment of the golf swing training device 1000 is depicted in FIGS. 23 to 25. Like reference numerals are used to denote features which are unchanged between the first and second embodiments, and the following description is focussed primarily on the differences. In the second embodiment, the length of the arm 304 is greater. Referring to FIG. 25, the arm 304 is pivotal about the shaft 334.

FIGS. 18 to 22 show a putting attachment 600 for use with the golf swing training device 100, for training a user's putting technique. Just as the above described swing training device 100 guides the hands on the preferred plane and the shaft of the golf club 400 on its preferred plane, the putting attachment 600 holds or retains any putter 402 and similarly guides the hands along the line of the intended putt both in the backswing and the follow through. This is achieved by adjusting the hoop 200 angle to 90 degrees to the floor so that the carriage 300 follows this line and, consequently so do the player's hands.

There are many brands and styles of putter 402 on the market and the angle of the shafts vary widely. The putting attachment 600 permits any putter 402 shaft to be set at the manufacturers intended angle, on account of the pivot connection 602 that is easily adjusted by hand, by loosening then adjusting the club 402 shaft angle, then tightening knob 604.

Figure 21:
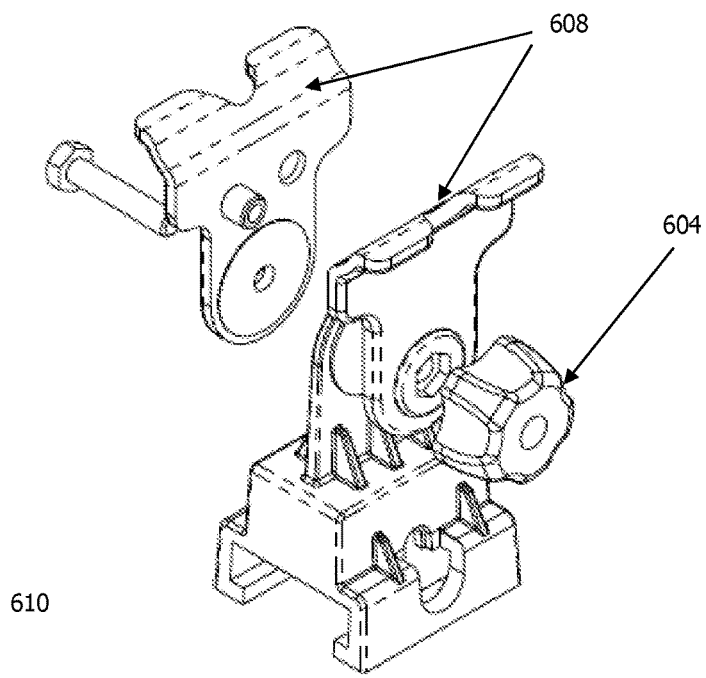
FIG. 21 is an exploded perspective view of a bracket of the putter holder of FIG. 18.
Figure 22:
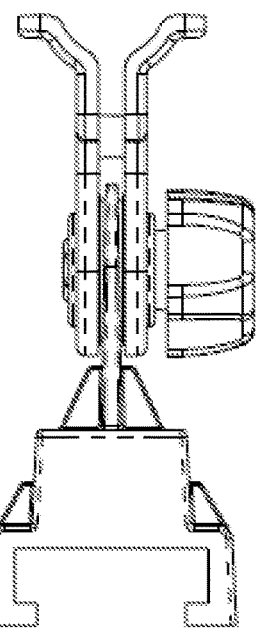
FIG. 22 is an end view of the bracket of FIG. 21.

The putting attachment 600 utilises a putter bracket 610 which is generally flat (as opposed to the wedge bracket 302), as shown in detail in FIGS. 21 and 22. The putting attachment 600 is used with the standard carriage assembly 300 described above. As shown in FIG. 21, the putter bracket 610 engages with the adjustment plate 402, and may be adjusted in the manner outlined above with respect to the wedge bracket 302.

The knob 604 is secured to a pair of opposing clamp plates 608 which secure a clip 609 around the shaft of the putter 402.

The third element of the technique that has been adopted by many touring professional golfers is that the stroke is performed with a rocking shoulder/arm action, with nil or very little movement in the wrists. In other words the wrists remain firm throughout the stroke. The present disclosure guides the player precisely in each of the above elements.

Figure 17:
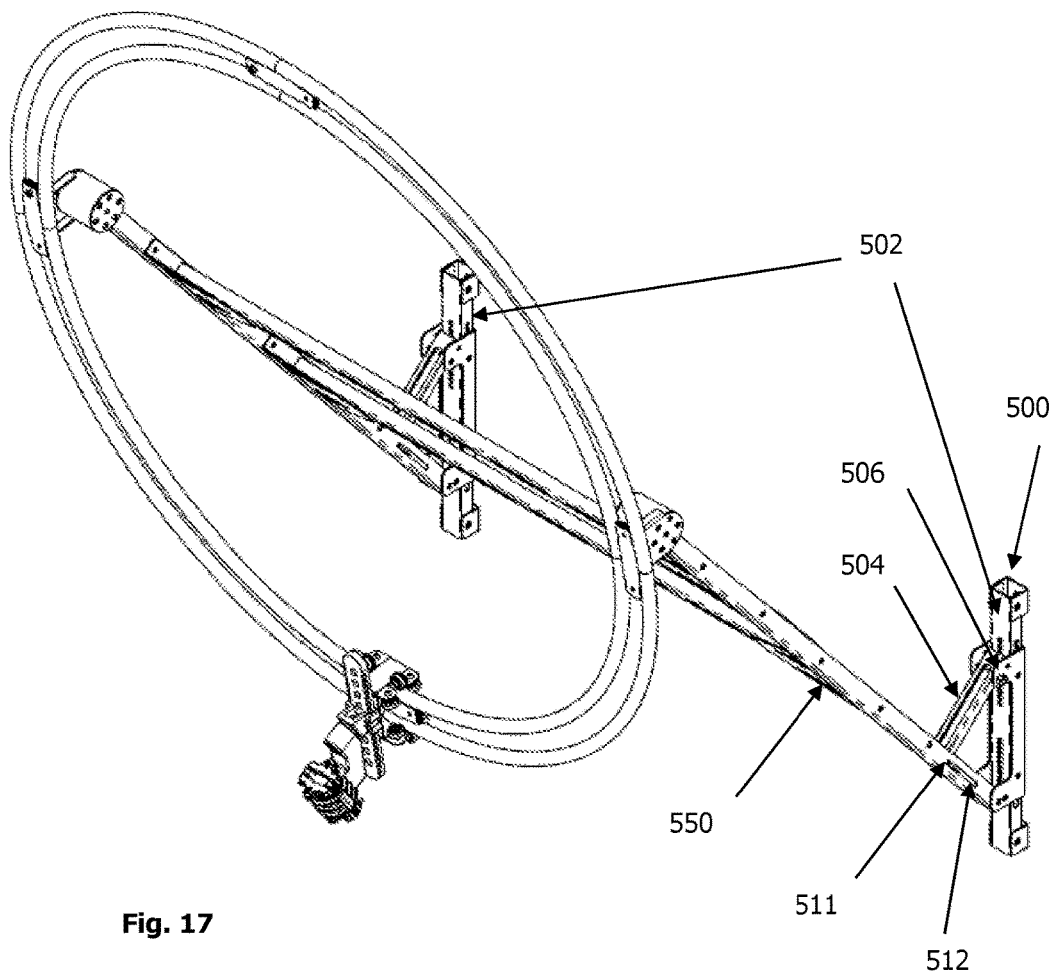
FIG. 17 is a perspective view of the golf swing training device of FIG. 15.
Figure 18:
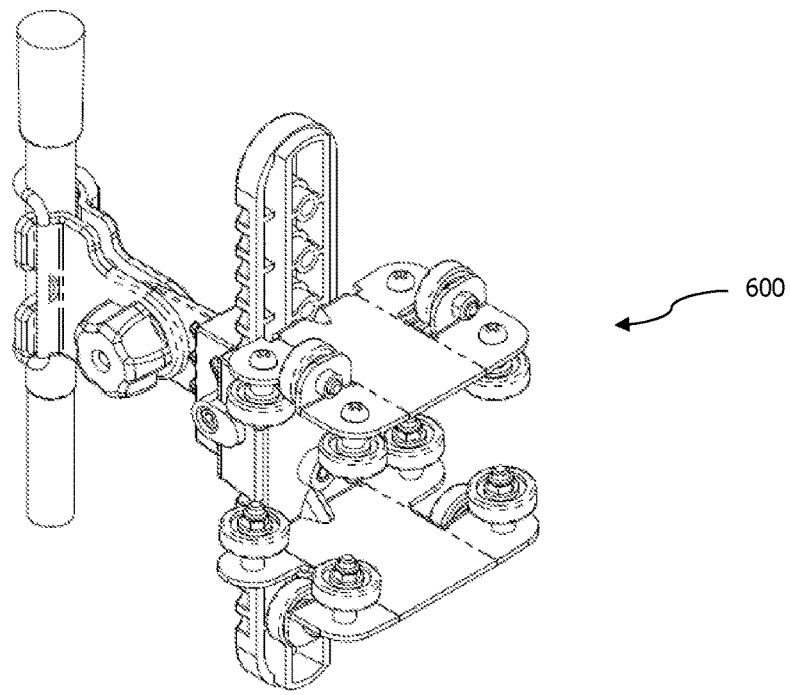
FIG. 18 is a rear perspective view of a putter holder according to the invention.
Figure 19:
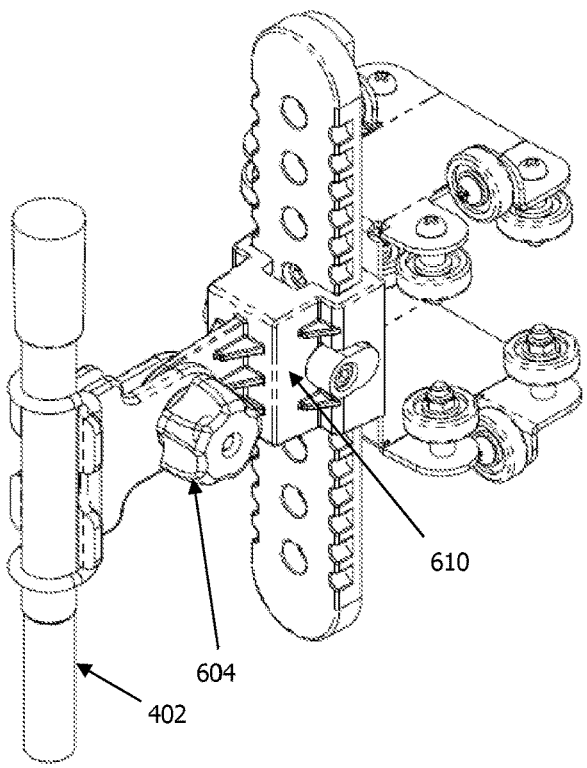
FIG. 19 is a front perspective view of the putter holder of FIG. 18.
Figure 20:
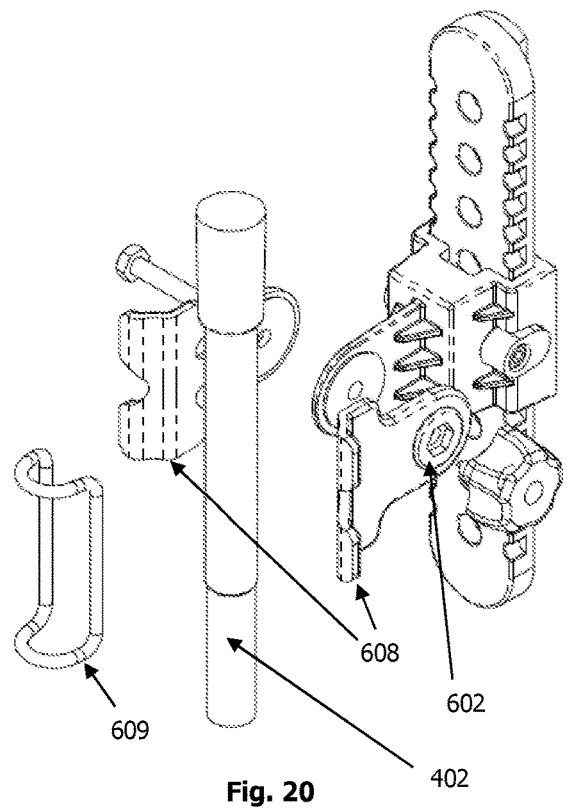
FIG. 20 is an exploded front perspective view of the putter holder of FIG. 18.

FIGS. 14 to 17 depict a wall mounting assembly 500 for use with the golf swing training device 100. Referring to FIG. 17, the wall mounting assembly 500 includes a pair of wall securement members 502. The wall securement members 502 are secured to a wall or other generally vertical surface with suitable fasteners, such as masonry anchors or coach screws, depending on the material that the wall is fabricated from.

Figure 14:
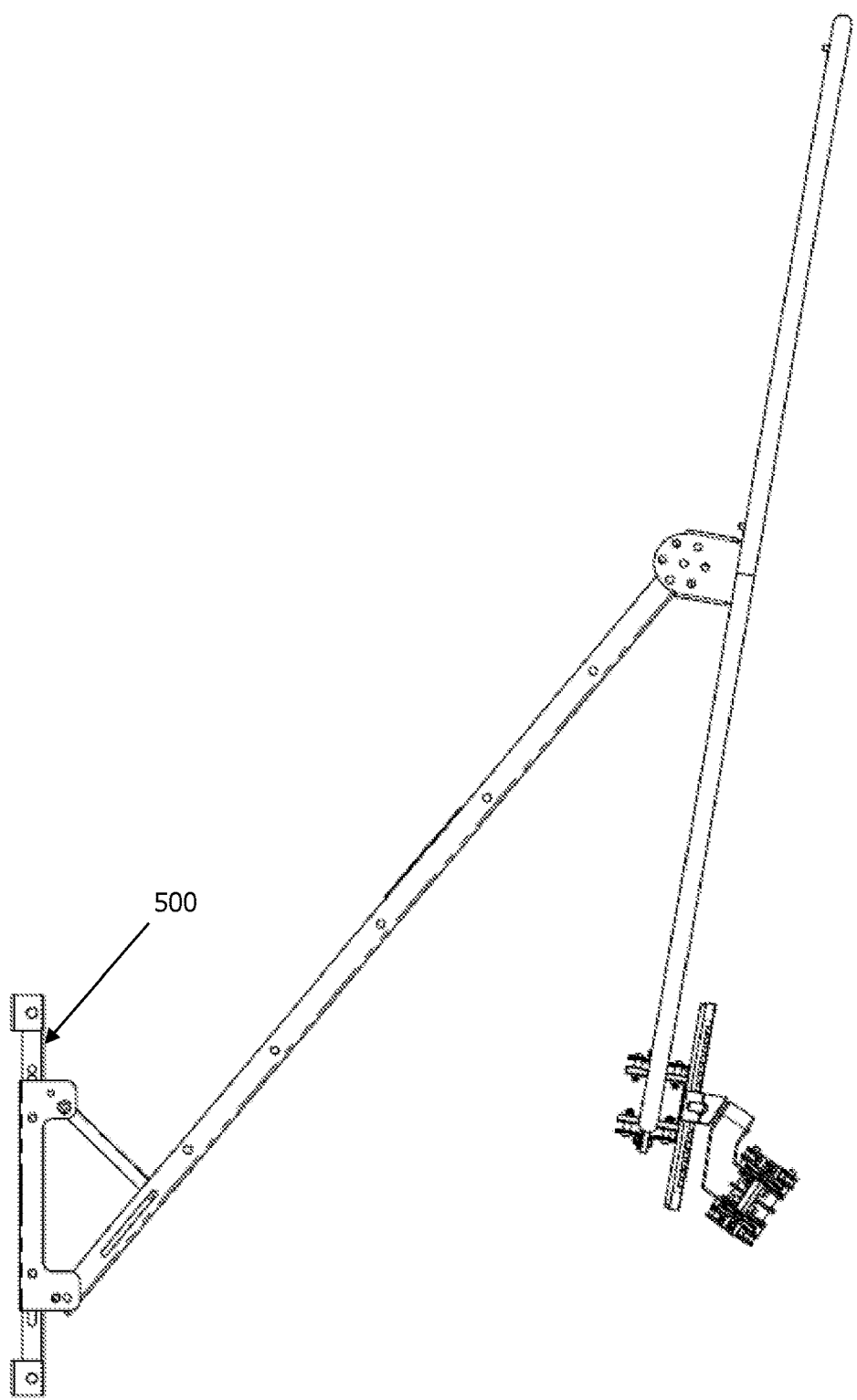
FIG. 14 is a side view of the golf swing training device including a wall mount assembly in an expanded configuration.
Figure 15:
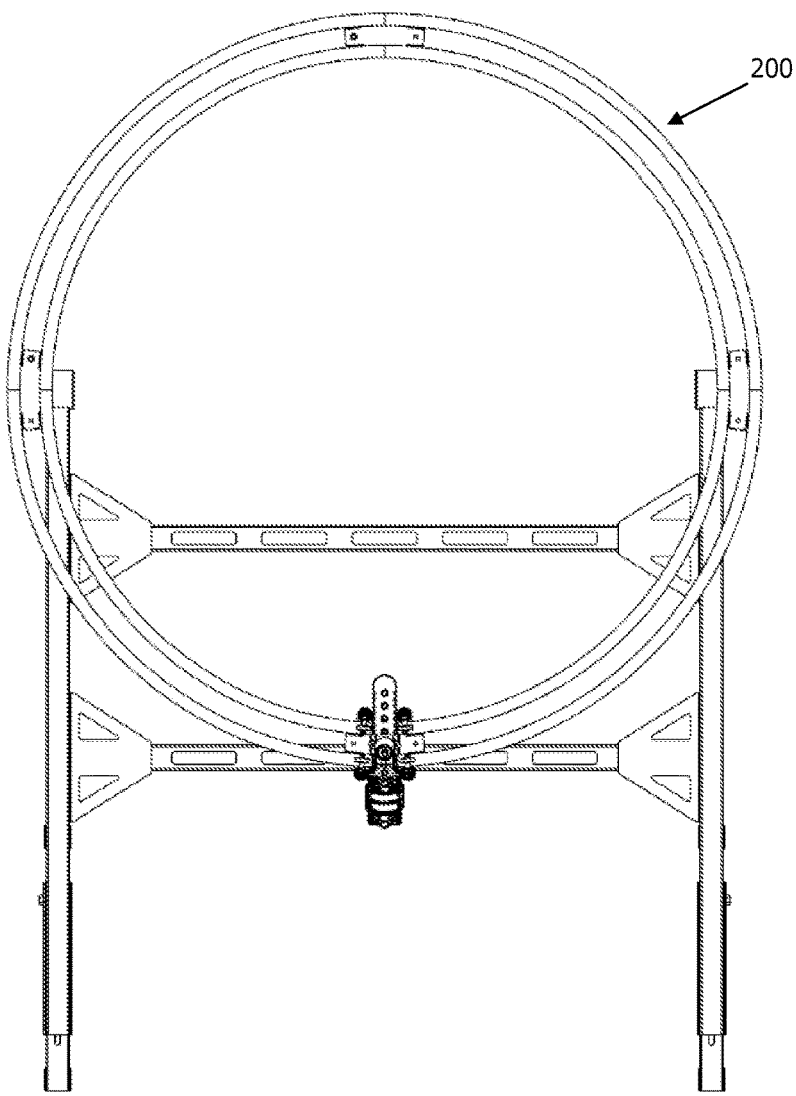
FIG. 15 is a front view showing the wall mount assembly in a retracted configuration.
Figure 16:
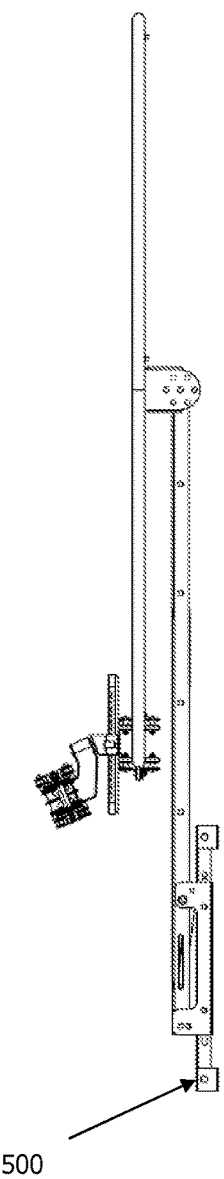
FIG. 16 is a side view showing the wall mount assembly in a retracted configuration.

In a first, stored configuration, as depicted in FIGS. 14 and 15, the hoop 200 is generally parallel with the wall and is located in proximity to the wall. This provides space saving advantages when not in use.

Before use, the hoop 200 is pulled away from the wall, into the second configuration depicted in FIG. 17. As this occurs, a proximal end of each of the pair of pivot arms 504 pivots about a pin 506. At the same time, a distal end of each arm 504 has a projection 511 which extends into a slot 512 formed within a hoop mounting arm 550. When the projection 511 reaches the end of the slot 512, the range of angular motion of the hoop mounting arm 550 is restricted, and this defines the second, in use configuration. The wall mounting unit 500 is based on a three bar linkage system.

Importantly, the golf swing training device 100 permits the player to practice the correct swing in slow motion. The reason this is important is because a typical swing takes about 2 seconds. In this time a player can only work on one, perhaps two thoughts, whereas there are usually 5 or 6 issues that need to be addressed—such as flat wrist at top, on the downswing—shoulders moving under & through, not around or towards the front, right elbow tucking into the right side on the downswing, releasing the club head as the hands pass the right thigh i.e. as late as possible for maximum acceleration through the ball, no lateral body movement in backswing, head steady and no lateral movement in follow through, club shaft creating the same plane on the follow through as it did on the backswing. In slow motion, while having the hands and shaft guided by the golf swing training device 100, each of these issues can be corrected in one swing, then gradually implemented into the players swing with just a few minutes each day on the trainer. The golf swing training device 100 guides the player correctly through each of the above movements/actions.

Advantageously, the golf swing training device 100 is suitable for either right or left handed players.

Advantageously, the golf swing training device 100 may be sold with either or both of the wall mounting unit 500 or the floor mounted base 110 and support frame 120, depending on user preference.

The components of the golf swing training device 100 may be fabricated from metal, or plastic (via plastic injection moulding or another suitable forming process).

Advantageously, the golf swing training device 100 locates the hoop 200 above the user's hands. This prevents the hoop 200 position from interfering with the club shaft during the backswing, the downswing and the follow through. In existing golf swing training devices, the hoop is not located above the user's hands, thereby preventing the club from taking the correct swing plane by interfering with the club shaft on both backswing and follow through.

Advantageously, the second embodiment of the invention, when used with the wall mounting assembly 500 can be folded away when not in use, for space saving and storage purposes.

Although the invention has been described with reference to specific examples, it will be appreciated by those skilled in the art that the invention may be embodied in many other forms.

The claims defining the invention are as follows:

1. A golf swing training device comprising:
a hoop positioned above and inclined relative to a ground;
a support frame connected to and adapted to support the hoop; and
a carriage having a body portion, a club holder being pivotally connected to the body portion, and a roller dolly being connected to the body portion, the roller dolly being secured to the hoop and adapted to rotate around a circumference of the hoop,
wherein a longitudinal club shaft axis of the club holder is angularly offset relative to a hoop plane which is perpendicular to an axis of symmetry of the hoop, and
wherein the club holder is positioned at a side where a user of the golf swing training device stands with respect to the hoop, and
wherein the roller dolly is adapted to pivot relative to the body portion of the carriage.

2. The golf swing training device of claim 1, further comprising a wedge bracket located between the body portion and the club holder, the wedge bracket being selectively interchangeable or adjustable to alter an angular offset of the longitudinal club shaft axis of the club holder relative to the hoop plane.

3. The golf swing training device of claim 2, further comprising a club holder arm having a proximal end pivotally connected to an inclined surface of the wedge bracket and a distal end connected to the club holder,
wherein the longitudinal club shaft axis is generally perpendicular to a pivot axis about which the club holder is pivotally connected to the wedge bracket.

4. The golf swing training device of claim 1, wherein the hoop includes a first ring and a second ring having a larger diameter, the first ring being located concentrically within the second ring.

5. The golf swing training device of claim 4, wherein first and second rings are each toroidal in cross-section and coplanar.

6. The golf swing training device of claim 4, wherein an annular clearance is located between the first and second rings.

7. The golf swing training device of claim 4, wherein the roller dolly includes a plurality of rollers, adapted to engage with the first and second rings.

8. The golf swing training device of claim 7, wherein the plurality of rollers includes a first set of rollers in engagement with the first ring and a second set of rollers in engagement with the second ring.

9. The golf swing training device of claim 8, wherein the first and second sets of rollers and the first and second rings restrict movement of the roller dolly to arcuate movement around a circumference of the hoop in a single plane.

10. The golf swing training device of claim 1, wherein the roller dolly is coupled to the body portion of the carriage with a shaft.

11. The golf swing training device of claim 1, wherein the club holder is adapted to pivotally support a golf club, such that the golf club is permitted to pivot about a longitudinal axis of a shaft of the golf club.

12. The golf swing training device of claim 11, wherein the club holder includes an external sleeve and an internal sleeve adapted to receive and abut against a portion of the shaft of the golf club, and
wherein the internal sleeve is adapted to rotate relative to the external sleeve.

13. The golf swing training device of claim 1, wherein a hand engagement portion of a grip of a golf club is located adjacent to the roller dolly, such that in use, a user's hands are directed to follow an arc corresponding generally to an arc followed by the roller.

14. The golf swing training device of claim 1, wherein the roller dolly and/or carriage body portion are adjustable to selectively alter a radius of an arc followed by a user's hands.

15. The golf swing training device of claim 1, further comprising a media support unit secured to the support frame.

16. The golf swing training device of claim 2, wherein the wedge bracket is secured to a mounting plate, wherein the wedge bracket is selectively moveable relative to a longitudinal axis of the mounting plate to adjust a radius of an arc of rotation of the club holder.

17. The golf swing training device of claim 16, wherein the mounting plate is secured to the body portion and the mounting plate is selectively moveable relative to the body portion to adjust the radius of the arc of rotation of the club holder.

18. The golf swing training device of claim 2, further comprising an extension arm located between the club holder and the roller dolly, such that the club holder is located below a lowermost portion of the hoop when the club holder is in an address position.

19. The golf swing training device of claim 18, wherein the extension arm is pivotally secured to the wedge bracket.

20. The golf swing training device of claim 1, further comprising a wall mounting assembly adapted to secure the hoop to a wall or other surface.

21. The golf swing training device of claim 20, wherein the wall mounting assembly includes:
at least one wall securement member adapted to be secured to a wall or other surface;
a pivot arm having a proximal end pivotally secured to the wall securement member and a distal end; and
a hoop mounting arm having a proximal end pivotally secured to the wall securement member and a distal end pivotally secure to the hoop, and
wherein a distal end of the pivot arm includes a projection which engages with a corresponding longitudinally extending slot formed on the hoop mounting arm.

22. The golf swing training device of claim 21, wherein the hoop mounting arm proximal end is located vertically beneath the pivot arm proximal end when installed on a wall or other generally vertical surface.

23. The golf swing training device of claim 1, further comprising a putter bracket located between the body portion and the club holder, the putter bracket being adjustably connected to the club holder to selectively alter an angular offset of the longitudinal club shaft axis of the club holder relative to the hoop plane.

* * * * *